United States Patent
Sharma et al.

(10) Patent No.: US 10,095,944 B2
(45) Date of Patent: Oct. 9, 2018

(54) METHODS AND SYSTEMS FOR SHAPE BASED IMAGE ANALYSIS FOR DETECTING LINEAR OBJECTS

(71) Applicant: Tata Consultancy Services Limited, Mumbai (IN)

(72) Inventors: Hrishikesh Sharma, Bengaluru (IN); Adithya Vellaiappan, Bengaluru (IN); Balamuralidhar Purushothaman, Bengaluru (IN)

(73) Assignee: Tata Consultancy Services Limited, Mumbai (IN)

( * ) Notice: Subject to any disclaimer, the term of this patent is extended or adjusted under 35 U.S.C. 154(b) by 172 days.

(21) Appl. No.: 15/212,731

(22) Filed: Jul. 18, 2016

(65) Prior Publication Data

US 2017/0061227 A1 Mar. 2, 2017

(30) Foreign Application Priority Data

Aug. 28, 2015 (IN) .......................... 3307/MUM/2015

(51) Int. Cl.
*G06K 9/48* (2006.01)
*G06K 9/32* (2006.01)
(Continued)

(52) U.S. Cl.
CPC ......... *G06K 9/3241* (2013.01); *G06K 9/4604* (2013.01); *G06K 9/6218* (2013.01)

(58) Field of Classification Search
CPC ... G06K 9/3241; G06K 9/4604; G06K 9/6218
See application file for complete search history.

(56) References Cited

U.S. PATENT DOCUMENTS 5,631,970 A * 5/1997 Hsu .................... G06K 9/00476
345/61
7,020,337 B2 3/2006 Viola et al.
(Continued)

OTHER PUBLICATIONS

Stansfield, Sharon "A Rule-Based Expert System for Automatic Segmentation of Coronary Vessels From Digital Subtracted Angiograms", IEEE Transactions on Pattern Analysis and Machine Intelligence, vol. PAMI-8, No. 2, pp. 188-199, Mar. 1986.*

(Continued)

*Primary Examiner* — Samir Ahmed
(74) *Attorney, Agent, or Firm* — Finnegan, Henderson, Farabow, Garrett & Dunner LLP

(57) ABSTRACT

The present disclosure provides systems and methods to enable detection of linear objects such as utility poles in complex and heterogeneous outdoor surroundings. The methods deal with shape and orientation as prominent features of a pole model. Candidate trapeziums from 2D images of the face of the poles are extracted, some of which represent parts of the pole. To overcome the missed detection of certain parts due to problems of occlusion and diffusion into background, shape based techniques, that extrapolate and capture a longer trapezium representing the pole is implemented. The region growing stage or extrapolation is driven by orientation-based clustering of trapeziums. Context information is further used to identify objects of interest, by discarding false positives. Besides detecting poles of interest, the detected poles are further analyzed to identify damages, if any.

14 Claims, 2 Drawing Sheets

(51) Int. Cl.
G06K 9/46 (2006.01)
G06K 9/62 (2006.01)

(56) References Cited

U.S. PATENT DOCUMENTS

| | | | |
|---|---|---|---|
| 7,672,484 B2 * | 3/2010 | Wiedemann | G06K 9/0063 |
| | | | 382/103 |
| 8,818,031 B1 | 8/2014 | Kelly et al. | |
| 2004/0131256 A1 * | 7/2004 | Fujieda | G06T 7/0006 |
| | | | 382/199 |
| 2006/0159368 A1 * | 7/2006 | Kondo | G06T 1/00 |
| | | | 382/299 |
| 2006/0233460 A1 * | 10/2006 | Kondo | G06T 3/403 |
| | | | 382/276 |
| 2013/0272569 A1 * | 10/2013 | Yumbe | G06K 9/3241 |
| | | | 382/103 |

OTHER PUBLICATIONS

Barranco-Gutierrez, A. et al., "An Approach for Utility Pole Recognition in Real Conditions", Image and Video Technology—PSIVT 2013 Workshops, Springer Berlin Heidelberg, pp. 113-121, (2013).

* cited by examiner

METHODS AND SYSTEMS FOR SHAPE BASED IMAGE ANALYSIS FOR DETECTING LINEAR OBJECTS

PRIORITY CLAIM

This U.S. patent application claims priority under 35 U.S.C. § 119 to: India Application No. 3307/MUM/2015 filed on Aug. 28, 2015. The entire contents of the aforementioned application are incorporated herein by reference.

TECHNICAL FIELD

The embodiments herein generally relate to image analysis and more particularly to methods and systems for shape based image analysis for detection of linear objects.

BACKGROUND

Maintenance of utility services and infrastructure is an important and expensive responsibility for stakeholders in every country. Infrastructures for such services typically include power grid, oil/gas/water pipelines, electrical poles, building columns, and the like. Faults and damages to structures can occur due to disasters, ageing of components, severe weather, overloading, overstraining and the like. Especially during disasters and emergencies, structural damage to conductors, poles, towers, etc. are expected. Particularly, structures having comparably smaller cross-sectional area that bear weight are more often susceptible to damage than other components. Stakeholders have to address and restore the damaged facility in a minimum time frame to ensure minimum disruption to life and activity. In the aftermath of disasters, it is difficult to detect damage to linear structures like utility poles that are spread out in vast areas, many a times at undetermined locations. To be able to efficiently deploy technical staff for restoration is a challenge, particularly when the locations of such damaged structures are unknown.

SUMMARY

Embodiments of the present disclosure present technological improvements as solutions to one or more of the above-mentioned technical problems recognized by the inventors in conventional systems.

In an aspect, there is provided a method comprising: receiving at least one image of linear objects of interest for analysis; extracting, by a blob extractor, homogeneous blobs, having generally polygonal contours, from the at least one image; classifying, by a trapezium classifier, the extracted polygons into candidate trapeziums; clustering, by a clustering module, the candidate trapeziums based on their spatial orientation and alignment of their medial axes; and detecting, by an analyzing and detecting module, the linear objects of interest from the longer trapeziums based on context information thereof.

In an embodiment of the present disclosure, extracting is preceded by a step of pre-processing, by a pre-processor, the at least one image to filter background clutter and accentuate the foreground.

In an embodiment of the present disclosure, pre-processing is based on discontinuity preserving filtering techniques.

In an embodiment of the present disclosure, the homogeneous blobs are extracted based on at least one of color and texture.

In an embodiment of the present disclosure, the extracted polygons have generally quadrilateral contours.

In an embodiment of the present disclosure, clustering the candidate trapeziums further comprises extrapolating and merging the clustered trapeziums to form longer trapeziums.

In an embodiment of the present disclosure, the context information is a cross arm associated with each of the linear objects of interest, the cross arm being detected based on one or more of extracting one or more types of generally polygonal contours; computing and sorting the detected trapeziums based on heights thereof; and angle of intersection of the cross arm with the detected linear objects of interest.

In an embodiment of the present disclosure, the method described herein above further comprises classifying the detected linear objects of interest as damaged based on one or more of height of the detected linear objects and inclination of the detected linear objects with respect to ground.

In another aspect, there is provided a system comprising one or more processors; and one or more internal data storage devices operatively coupled to the one or more processors for storing instructions configured for execution by the one or more processors, the instructions being comprised in: a blob extractor configured to extract homogeneous blobs having generally polygonal contours, from at least one image of linear objects of interest; a trapezium classifier configured to classify the extracted polygons into candidate trapeziums; a clustering module configured to cluster the candidate trapeziums based on their spatial orientation and alignment of their medial axes; and an analyzing and detecting module configured to detect the linear objects of interest from the longer trapeziums based on context information thereof.

In an embodiment, the system described herein above further comprises a pre-processor configured to pre-process the at least one image to filter background clutter and accentuate the foreground.

In an embodiment, the clustering module is further configured to extrapolate and merge the clustered trapeziums to form longer trapeziums.

In an embodiment, the analyzing and detecting module is further configured to classify the detected linear objects of interest as damaged based on one or more of height of the detected linear objects and inclination of the detected linear objects with respect to ground.

In yet another aspect, there is provided a computer program product comprising a non-transitory computer readable medium having a computer readable program embodied therein, wherein the computer readable program, when executed on a computing device, causes the computing device to: receive at least one image of linear objects of interest for analysis; extract homogeneous blobs, having generally polygonal contours from the at least one image; classify the extracted polygons into candidate trapeziums; cluster the candidate trapeziums based on their spatial orientation and alignment of their medial axes; and detect the linear objects of interest from the longer trapeziums based on context information thereof.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
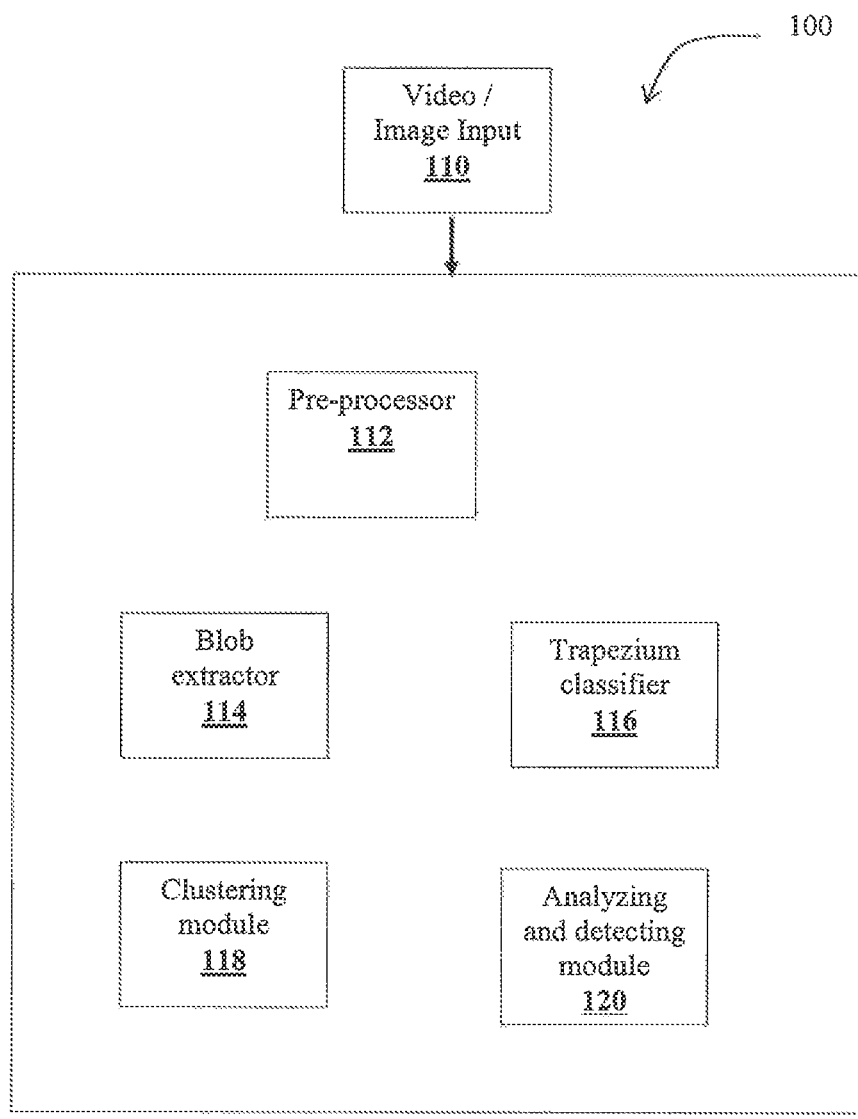
FIG. 1 illustrates an exemplary block diagram of a system for analyzing images of linear objects in accordance with an embodiment of the present disclosure.
Figure 2:
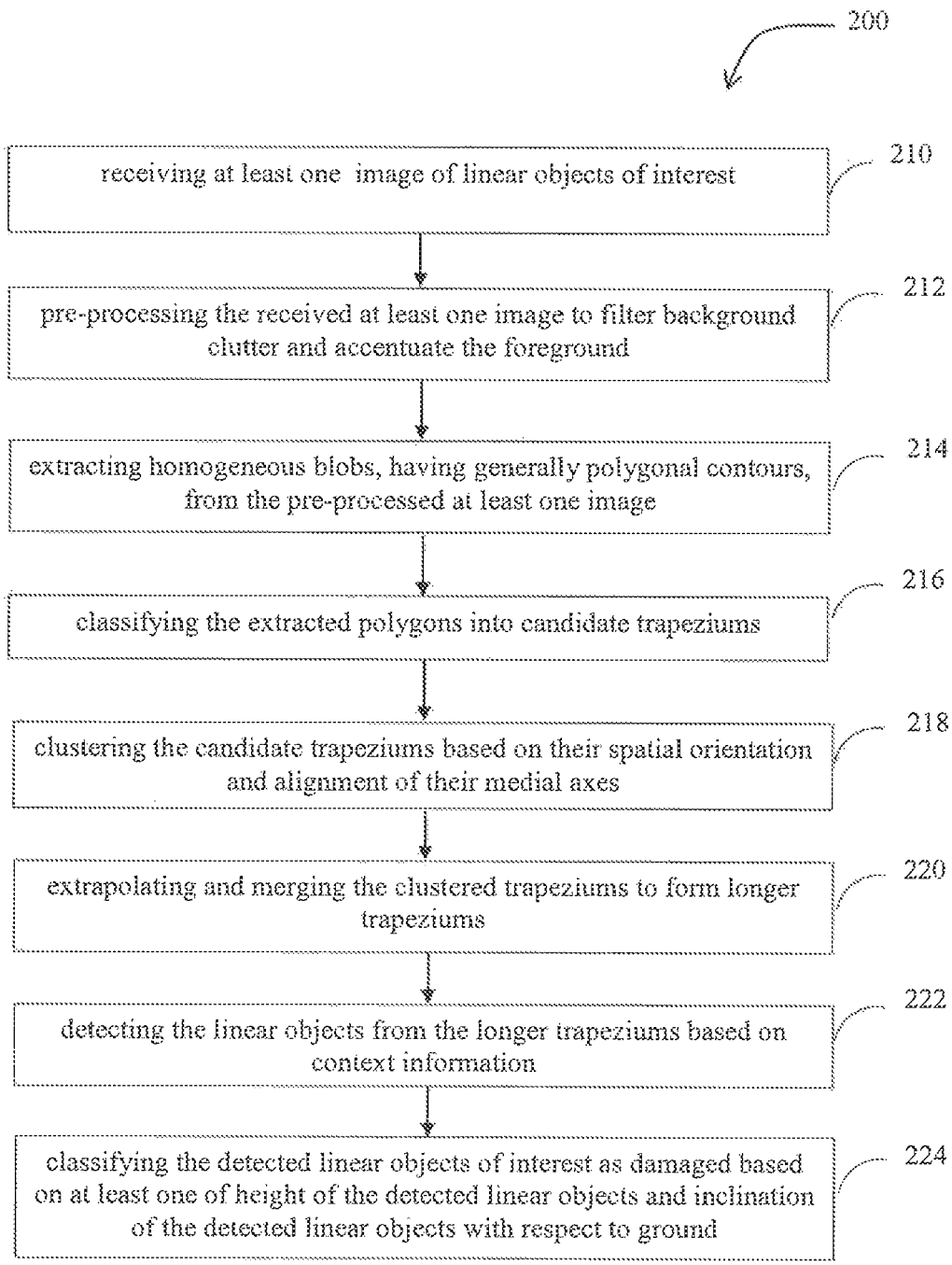
FIG. 2 is an exemplary flow diagram illustrating a computer implemented method for analyzing images of linear objects using the system of FIG. 1 in accordance with an embodiment of the present disclosure.

Referring now to the drawings, and more particularly to FIGS. 1 and 2, where similar reference characters denote corresponding features consistently throughout the figures, there are shown preferred embodiments and these embodiments are described in the context of the following exemplary system and method.

FIG. 1 illustrates an exemplary block diagram of a system 100 for analyzing images of linear objects in accordance with an embodiment of the present disclosure and FIG. 2 is an exemplary flow diagram illustrating a computer implemented method 200 for analyzing images of linear objects using the system of FIG. 1. The steps of method 200 of the present disclosure will now be explained with reference to the components of system 100 as depicted in FIG. 1 for analyzing images of linear objects of interest. In an embodiment, system 100 includes one or more processors (not shown), communication interface device(s) or input/output (I/O) interface(s) (not shown), and memory or one or more internal data storage devices or memory (not shown) operatively coupled to the one or more processors. The one or more processors being hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, system 100 can be implemented in a variety of computing systems such as a laptop computer, a desktop computer, a notebook, a workstation, a mainframe computer, a server, a network server, cloud, hand-held device and the like.

The I/O interface can include a variety of software and hardware interfaces, for example, a web interface, a graphical user interface, and the like and can facilitate multiple communications within a wide variety of networks and protocol types, including wired networks, for example, LAN, cable, etc., and wireless networks, such as MLAN, cellular, or satellite. In an embodiment, the I/O interface can include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the various modules (112, 114, 116, 118 and 120) of system 100 can be stored in the memory.

The expression "linear objects" as referred to in the present disclosure refers to at least one of utility poles, building columns, beams, segments of pipes, segments of railway tracks, and the like wherein at least a portion of the object is linear and has a finite length within a captured image.

In the context of the present disclosure, the expression "trapezium" or "trapezoid" refers to a quadrilateral having at least a pair of substantially parallel edges and may be used interchangeably.

In the context of the present disclosure, linear objects of interest may have a circular cross-section like cylindrical poles or they may have a polygonal cross-section like rectangular or fluted poles. However, 2D projected images of the linear objects or images as referenced herein, would be characterized by a trapezoid shaped face, as defined herein, irrespective of the cross sectional shape of the linear object.

For ease of explanation, the description of systems and methods of the present disclosure is provided with reference to a non-limiting example of detecting utility poles by analyzing images of pole like structures captured from an area under consideration. In the context of the instant example, the expression "linear object" used throughout the explanation would refer to utility poles. In an exemplary situation, to be able to efficiently deploy technical staff, in the aftermath of a disaster, to restore power supply, it is imperative to be able to firstly locate utility poles that may be spread out in the area and also identify poles that may be damaged. For instance, the poles may be uprooted, may be leaning over with a degree of leaning that may be unacceptable or unsafe for operation, may be broken, and the like.

Typically, commercial Unmanned Aerial Vehicles (UAV) or drones are employed to cover vast damage areas and collect aerial surveillance videos or capture images. The surveillance video can then be analyzed first for areas where specific linear objects of interest are located, and then for damage detection and characterization of degree of damage. The video generated out of survey of a vast area tends to be quite long. An automated algorithm is employed to efficiently extract key frames from the video in which linear objects of interest or utility poles, in the exemplary scenario, are detected. Thus input to the systems of the present disclosure include at least one image that may be captured in the form of an image directly or may be extracted from captured videos. Such images are then analyzed by methods and systems of the present disclosure to identify firstly the utility poles from the myriad of linear objects that may be detected and then assess the degree of damage to the poles for efficient scheduling and deployment of technical staff for initiating restoration efforts.

Referring to FIGS. 1 and 2, at step 210, at least one image 110 is received. Typically, urban background of utility poles is complex with significant number of edges in the background that can be detected from captured images. It is imperative that the method of analyzing the image is capable of identifying presence of edges pertaining to utility poles, in the exemplary scenario presented herein.

In accordance with an embodiment, the received images are filtered. A pre-processor 112 can, at step 212, pre-process the received images to filter background clutter and accentuate the foreground to distinguish edges of utility poles vis-à-vis other edges that may be detected in the captured images. In an embodiment, the step of pre-processing can be achieved by mean shift based filtering. Alternatively, any discontinuity preserving filter known in the art such as nonlinear anisotropic diffusion or bilateral filtering may be employed.

At step 214, a blob extractor 114 can extract homogeneous blobs, having polynomial resembling contours, from the images which may be pre-processed in an embodiment. In an embodiment, the extracted polygons have generally quadrilateral contours. In an embodiment, polygonal shaped blogs may be extracted to enable detecting triangular regions as explained in step 222 herein below. Due to perspective projection, the long rectangular faces appear as trapezium in a 2D (2 dimensional) image. Further, the faces of structures like the utility poles of interest in the instant exemplary scenario are prone to wear and tear in the form of dents due to shear. Hence there is "noise" in the edges of such imaged trapezium. Also, there can be occlusion along the length of the trapezium due to shadow of some other object nearby, falling on the pole. Part of the pole, especially its bottom can be occluded by low-height shrubs. Occlusion due to pasting of posters, notices, painting of labels, etc. is also commonly observed for linear erect objects. Furthermore, a common problem observed with most long linear objects is that foreground area is very small and homogeneous when compared to the vast, heterogeneous background, and there can be many false positives for such objects. Hence the edge features are not continuous, but show variations in few segments. Finally, since the surface of the pole is homogeneous, any part of its face in a shadow region and any contiguous background that is also in shadow, has similar color properties. Hence the method of the present disclosure detects a "noisy" shape having similarity to a long trapezium. In an embodiment, the homogenous blobs are extracted based on at least one of color and texture. For instance, color-based mean shift clustering of the images may be used to extract "homogeneous" blobs, where the images may be pre-processed in an embodiment. The choice of color as the homogeneous feature representative of the surface of a utility pole can be replaced with any other feature or set of features. The shape of each blob is then ascertained and blobs with quadrilateral-resembling contours are shortlisted.

In accordance with the present disclosure, the shape detection has a 15% tolerance for noise in the edges. It is expected that few occluded parts of the pole do not appear as part of quadrilateral that bounds the pole, thus breaking up pole surface into multiple quadrilaterals. Further, in some parts, especially in shadow region, object contour can leak into background during flood filling in an unstructured fashion, due to locally weak edges. Hence, again, these parts cannot be fitted into a quadrilateral easily. To localize these breakages in the pole quadrilateral, each quadrilateral whose bounding box is more than 25% of image height, is divided into smaller ones whose bounding box is of size 10% of image height or less. In accordance with an embodiment, a series of quadrilaterals are detected with few in the series missing due to occlusion or contour leak. Localization helps in reducing false negatives. Extrapolation around the localized breakages in the shape is performed to detect a pole. If the set of blobs after clustering are arranged in an arbitrary sequence $b_i$, then the subset of blobs that are quadrilaterals is defined as follows:

$$\{Quads\}\{\exists b_i \in Blobs : No(Edge\{b_i\}) = 4\} \quad (1)$$

At step 216, a trapezium classifier 116 can classify the extracted quadrilaterals which have at least one pair of substantially parallel edges, as candidate trapeziums.

At step 218, a clustering module 118 can cluster the candidate trapeziums based on their spatial orientation. Since a trapezium has at least two parallel edges, the orientation of a detected trapezium is represented by the average orientation of two near-parallel edges of a detected quadrilateral. Approximate parallelism is considered to factor in the noise in the edges. All candidate trapeziums having similar orientation and the centroid of their bounding boxes are in the vicinity of a single hypothetical line connecting the centroids of the bounding boxes in image plane, having such orientation are clustered.

At step 220, the clustering module 118 can extrapolate and merge the clustered trapeziums to form longer trapeziums and alignment of their medial axes. A bounding trapezium of a pole corresponds to series of smaller detected trapeziums inside. While most of these trapeziums are contiguous, at few places, there are regions within the bounding trapezium which correspond to breakages or discontinuity. Since the faces of a pole are homogeneous, especially in shape, these gaps in shape can be filled up by extrapolation techniques such as region growing. To extrapolate for localized discontinuity in shape around the hypothetical line, it is expected that "gap" length, between centroids of bounding box of two successive quadrilaterals in a merged segment, be not more than 10% of image height. Assuming Traps to be the subset of quadrilaterals that are candidate trapeziums, $t_i$, $t_j$ to be two arbitrary trapeziums in this subset, angle $\{t_i\}$ to be the orientation of the medial line of the trapezium $t_i$, and medial $\{t_i\}$ be the physical location in 2D pixel space of the medial line of $t_i$, the core model of construction a long trapezium out of various $t_i$s, depicting the utility pole, is as follows.

$$\{Long\ Trap.\} = \cup \{t_i, t_j \in Traps : \{angle\{t_i\} \approx angle\{t_j\}\} \wedge \{medial\{t_i\} \approx medial\{t_j\}\}\} \quad (2)$$

After step 218, along with many other long trapeziums as false positives, a major portion of utility poles are detected as well.

At step 222, an analyzing and detecting module 120 can detect the linear objects, or the utility poles in this case, from the long trapeziums based on context information. After step 218, along with many other long trapeziums as false positives, a major portion of utility poles are detected as well. To locate the true positive, context information is utilized by the method of the present disclosure. In the case of the instant exemplary scenario, since utility poles are a part of power distribution grids, it may be expected that the top of a utility pole has at least one insulator, at least one conductor and at least one cross arm mounting at least one insulator that suspends the conductor in its spatial vicinity. Moreover, all the cross arms are riveted to the pole in a perpendicular fashion, so that the gravitational load of symmetrically placed conductors gets balanced on the pole. Since cross arms are a relatively bigger structure among these, and also relatively prominent object in pole-top vicinity, presence of at least one perpendicularly placed cross arm to one of the long trapeziums can be used as context information to reject false positives. This in turn entails locating a long enough trapezium, and a short enough trapezium, the first of which represents part of a pole, and second represents part of a cross arm which may be detected at least on one (left or right) side of the detected part of the utility pole.

While presence of cross-arm happens to be a useful context information in case of detection of utility poles, it is expected, and always practical, to have an additional linear object in spatial vicinity of the linear desired object, as the object that establishes the context for the former.

To be able to locate cross arms, the present disclosure provides a similar method as described herein above of detecting shapes and merging the shapes in a way so as to extrapolate them for locally missed detection. However, cross arms being thin structures, and also due to the presence of rivets, riveting plate, etc. along the bar, the image of the surface of the cross arm is not just thin and small, but also has many corner points, some of which are located in close vicinity of each other. So both quadrilaterals and triangles (from generally polygonal contours at step 214) are considered as possible regions for merging into a cross arm. To reduce the search space, all the detected trapeziums are sorted by the height of their bounding box. The medial lines of the sorted trapeziums are then extrapolated, since parts of both pole and cross arm that are detected may not be spatially intersecting. The longer trapeziums are then considered in sorted order to locate from the bottom of the sorted sequence, at least one trapezium as follows—

$$\text{Pole} = \{L_i, L_j \in \{\text{Long Trap.}\}: \\ \text{Angle}\{L_i\} = \text{Angle}\{L_j\} \approx 90°\} \quad (3)$$

This trapezium must have height less than 20% of the longer trapezium currently being considered, its centroid must be present within a short distance from the upper half of the pole and whose medial line intersects the medial line of the longer trapezium between 80 deg. and 100 deg. It may be noted that though the cross arm and pole are perpendicularly mounted, this perpendicularity is only visible in 3-D space. In the worst case, given the distance between a ground observer, and the crossbar being mounted far away in the air at 20+ meters, the 2-D projection shows around 80 to 100 angle of intersection. The first composite shape showing such perpendicularly placed trapeziums is deemed as the utility pole. Any other structure like this may also be another pole, but will be classified as being part of the background, and search can be terminated after first detection of such composite shape.

In an embodiment, the method described herein above can further comprise analyzing the detected poles to find out which poles are damaged. As illustrated in FIG. 2, at step 224, the detected linear objects of interest can be classified as damaged based on at least one of height of the detected linear objects and inclination of the detected linear objects with respect to ground. In the instant exemplary embodiment, poles may be completely uprooted and lying horizontally on the ground, they may be damaged on the surface or broken. In an embodiment, detection of damage to the poles may be computed based on degree of leaning of the detected pole. The angle subtended by the medial line of the bounding box of the detected pole region is computed with respect to a line that is to be detected on earth's surface/ground. The latter line is easily detectable in daytime as the edge of the shadow of the pole itself. The shadow is detected by looking at the bottom of the pole, and at least two edges, in form of straight lines, converging to that. To be able to characterize a pole as erect, the subtended angle has to be 90 degrees. Else, it is deemed a leaning pole. In accordance with another embodiment, total standard height of the pole of interest can be compared with the computed total height of the pole detected to conclude on whether the detected pole is broken and hence required to be classified as damaged. In yet another embodiment, a bent pole may be detected by combining degree of leaning along with analysing breakages in the pole detected.

Experimental Results

A standard Canon 12 MP f/2.8 RGB camera was used for imaging. The frame size was shortened to 1280×960 for testing purposes. Anomaly data was collected from rural regions. Poles embedded in the soil in rural areas are prone to tilting, since the soil beneath can move and reshape easily. Poles exhibiting any kind of occlusion were specifically imaged to complicate the test dataset. Finally, anomalous poles were not found in one long stretch, but were randomly located in various kinds of geographical regions, as expected. Hence the background of all such images is highly variable, and not only heterogeneous. Also, the images were taken at different times of the day, so that photometric and shadow issues were also variable. All such scenarios were considered to test the robustness of the systems and methods of the instant disclosure, against different kinds of variations. Up to 20 images were detected as damaged poles from 127 images of normal/upright poles, by systems of the instant disclosure.

In terms of absolute performance, the method of the instant disclosure was able to detect tilted poles in 70% of cases. In 95% cases, the method of the instant disclosure detected some pole-like object, and in 5% cases, it missed the detection altogether. From the angle of binary classification, it is that this amounts to a precision measure of 0.95, and recall measure of 0.67. However, when we compare its performance to existing work, we show that performance of our algorithm is in fact superior.

Detection of poles was also performed by methods known in the art and it was found that prior art methods could only detect pole-like objects in 60% of the images, and cross arms in none. The improved performance of the methods and systems of the instant disclosure can be attributed to the complexity of images analysed by the systems of the instant disclosure. The images used by prior art systems mostly have a close-in view of the pole top, and hence most of the background is only sky. Also, due to zoomed in images, the length of the partial pole imaged is not very short when compared to the length of the cross arm in the prior art dataset making detection less accurate. In the instant disclosure, the method rejects detection of cross arm since its relative length is too small, and hence the corresponding peak in transform domain is insignificant compared to peak that of the pole.

It may be noted that the complexity of mean-shift stage can be as low as $O(n)$, wherein $O(n)$ refers to universally standard notation and measure of runtime complexity of any algorithm implemented on a standard computer. Again, feature-based blob extraction has known complexity of size of graph, i.e. $O(n^2)$. Extraction of both quadrilaterals and trapeziums are contour-based methods. Hence their complexity is of the order of image boundary, i.e. $O(n)$. Iterative merging of trapeziums considers a local window/block, as a candidate for merging. Given constant grid size, its complexity is of order of $O(n^2)$. Similarly, due to working in a neighboring window, the context-based recognition of pole, via identifying a cross arm near the top of a long trapezium, also has a complexity of O ($n^2$). In summary, the overall complexity of the algorithm is bounded by O ($n^2$), which is acceptable for computation over a handheld device.

Since power supply may not be available around disaster time, the methods and systems of the instant disclosure were tested for deployment feasibility on battery-operated portable devices also. Specifically, the system of the instant disclosure was implemented on a resource-constrained device, Motorola Moto G XT running Android OS v 4.4.1 to test field-worthiness. A GUI-based application was developed that can help operators/supervisors to get surveillance data and perform analysis on it. The application was synchronized to a surveillance database, may be hosted using Wi-Fi hotspot, via a wireless link/WLAN, and downloaded a selected video. The application started with an authentication screen, and the database could be synchronized only by authorized users. A set of assigned/unassigned videos to an authorized operator was then displayed. The operator could choose any of the videos, the selection of which led to automatic execution of the method of the instant disclosure and a set of key frames were created that highlighted the detected part. These key frames were then presented to the operator one-by-one for his study. The application was also ported and tested on another smartphone, Samsung Galaxy Note NT, running the same OS.

Although the description is directed towards detection of utility poles, it may be understood that systems and methods of the instant disclosure can be applied to other linear objects as defined herein above.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following anyone of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A computer implemented method for shape based image analysis of linear objects, the method comprising:
   receiving at least one image of the linear objects, wherein the at least one image of the linear object corresponds to a linear object of interest, wherein the linear object is an object comprising at least a portion of the object with a linear and a finite length in the at least one image;
   extracting, homogeneous blobs from the at least one image using a blob extractor having polygonal contours;
   classifying the extracted polygonal contours by identifying a quadrilateral resembling contour based on shape of each blob of the homogeneous blobs using a trapezium classifier, wherein the classified quadrilateral-resembling contour is identified as candidate trapeziums having at least one pair of parallel edges;

clustering, the candidate trapeziums based on spatial orientation and alignment of medial axes of the candidate trapezium and sorting the candidate trapeziums based on height of the candidate trapeziums to obtain longer trapeziums;

detecting the linear objects of interest from the longer trapeziums based on context information, wherein the context information is a cross arm associated with each of the linear objects of interest, wherein the cross arm is detected based on the extracted polygonal contours, height of the longer trapeziums and angle of intersection of the cross arm with the detected linear objects of interest; and classifying the detected linear objects of interest as damaged based on at least one of height of the detected linear objects and inclination of the detected linear objects with respect to ground.

2. The method of claim 1, wherein extracting is preceded by a step of pre-processing, by a pre-processor, the at least one image to filter background clutter and accentuate foreground area of the linear objects.

3. The method of claim 2, wherein the step of pre-processing is based on discontinuity preserving filtering techniques, wherein the step of pre-processing comprises distinguishing edges of the linear objects with other edges detected in the at least one image of the linear objects.

4. The method of claim 1, wherein the homogeneous blobs are extracted based on at least one of color and texture of the at least one image.

5. The method of claim 1, wherein the extracted polygons have quadrilateral contours.

6. The method of claim 1, wherein clustering the candidate trapeziums further comprises extrapolating and merging the clustered trapeziums to form longer trapeziums.

7. A system for shape based image analysis of linear objects, the system comprising:
one or more processors; and
one or more internal data storage devices operatively coupled to the one or more processors for storing instructions configured for execution by the one or more processors, the instructions being comprised in:
receive at least one image of the linear objects, wherein the at least one image of the linear object corresponds to a linear object of interest, wherein the linear object is an object comprising at least a portion of the object with a linear and a finite length in the at least one image;
a blob extractor configured to extract homogeneous blobs having polygonal contours from the at least one image of the linear objects of interest;
a trapezium classifier configured to classify the extracted polygons contours by identifying a quadrilateral resembling contour based on shape of each blob of the homogeneous blobs, wherein the classified quadrilateral-resembling contour is identified as candidate trapeziums having at least one pair of parallel edges;
a clustering module configured to cluster the candidate trapeziums based on spatial orientation and alignment of medial axes of the candidate trapezium and sorting the candidate trapeziums based on height of the candidate trapeziums to obtain longer trapeziums; and
an analyzing and detecting module configured to detect the linear objects of interest from the longer trapeziums based on context information, wherein the context information is a cross arm associated with each of the linear objects of interest, wherein the cross arm is detected based on the extracted polygonal contours, height of the longer trapeziums and angle of intersection of the cross arm with the detected linear objects of interest; and classify the detected linear objects of interest as damaged based on at least one of height of the detected linear objects and inclination of the detected linear objects with respect to ground.

8. The system of claim 7, further comprising a pre-processor configured to pre-process the at least one image to filter background clutter and accentuate foreground area of the linear objects.

9. The system of claim 7, wherein the clustering module is further configured to extrapolate and merge the clustered trapeziums to form longer trapeziums.

10. A computer program product comprising a non-transitory computer readable medium having a computer readable program embodied therein, wherein the computer readable program, when executed on a computing device, causes the computing device to:
receive at least one image of the linear objects, wherein the at least one image of the linear object corresponds to a linear object of interest, wherein the linear object is an object comprising at least a portion of the object with a linear and a finite length in the at least one image;
extract homogeneous blobs from the at least one image using a blob extractor having polygonal contours;
classify the extracted polygons contours by identifying a quadrilateral resembling contour based on shape of each blob of the homogeneous blobs, wherein the classified quadrilateral-resembling contour is identified as candidate trapeziums having at least one pair of parallel edges;
clustering, the candidate trapeziums based on spatial orientation and alignment of medial axes of the candidate trapezium and sorting the candidate trapeziums based on height of the candidate trapeziums to obtain longer trapeziums;
detect the linear objects of interest from the longer trapeziums based on context information wherein the context information is a cross arm associated with each of the linear objects of interest, wherein the cross arm is detected based on the extracted polygonal contours, height of the longer trapeziums and angle of intersection of the cross arm with the detected linear objects of interest; and
classifying the detected linear objects of interest as damaged based on at least one of height of the detected linear objects and inclination of the detected linear objects with respect to ground.

11. The method of claim 1, wherein the linear objects comprises utility poles, building columns, beams, segments of pipes, segments of railway tracks, pipelines and power grid.

12. The method of claim 1, wherein the spatial orientation of the candidate trapezium is represented by an average orientation of two near-parallel edges of the identified quadrilateral resembling contours.

13. The system of claim 7 is further configured to extrapolate and merged the clustered trapeziums to form longer trapeziums.

14. The system of claim 8, wherein the pre-processor pre-process the at least one image to filter background clutter and accentuate the foreground by distinguishing edges of the linear objects with other edges detected in the at least one image of the linear objects.

* * * * *